March 5, 1963

C. T. FOSS ETAL 3,080,514

REMOTE CONTROL SWITCHING SYSTEM

Filed Jan. 10, 1948

INVENTORS.
CLIFTON T. FOSS &
JOHN J. GIBA

BY

*Campbell Brumbaugh & Free*
THEIR ATTORNEYS.

March 5, 1963  C. T. FOSS ETAL  3,080,514
REMOTE CONTROL SWITCHING SYSTEM
Filed Jan. 10, 1948  6 Sheets-Sheet 2
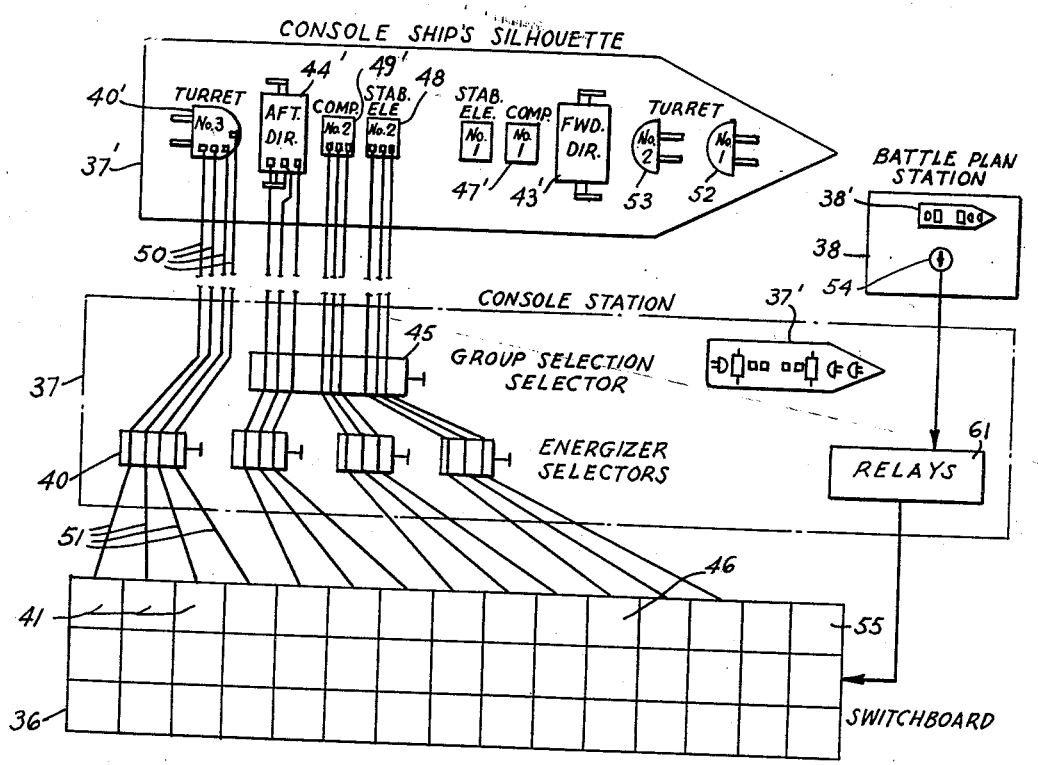
FIG.4A.
FIG.4.
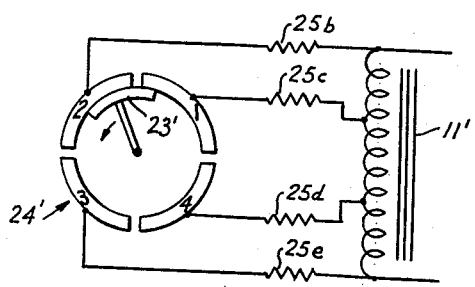
FIG.2.
INVENTORS.
CLIFTON T. FOSS &
BY   JOHN J. GIBA
THEIR ATTORNEYS.

March 5, 1963

C. T. FOSS ETAL 3,080,514

REMOTE CONTROL SWITCHING SYSTEM

Filed Jan. 10, 1948

INVENTORS.
CLIFTON T. FOSS &
JOHN J. GIBA
BY
Campbell, Brumbaugh & Lea
THEIR ATTORNEYS.

March 5, 1963

C. T. FOSS ETAL 3,080,514

REMOTE CONTROL SWITCHING SYSTEM

Filed Jan. 10, 1948

INVENTORS.
CLIFTON T. FOSS &
JOHN J. GIBA
BY

*Campbell Brumbaugh & Lee*
THEIR ATTORNEYS.

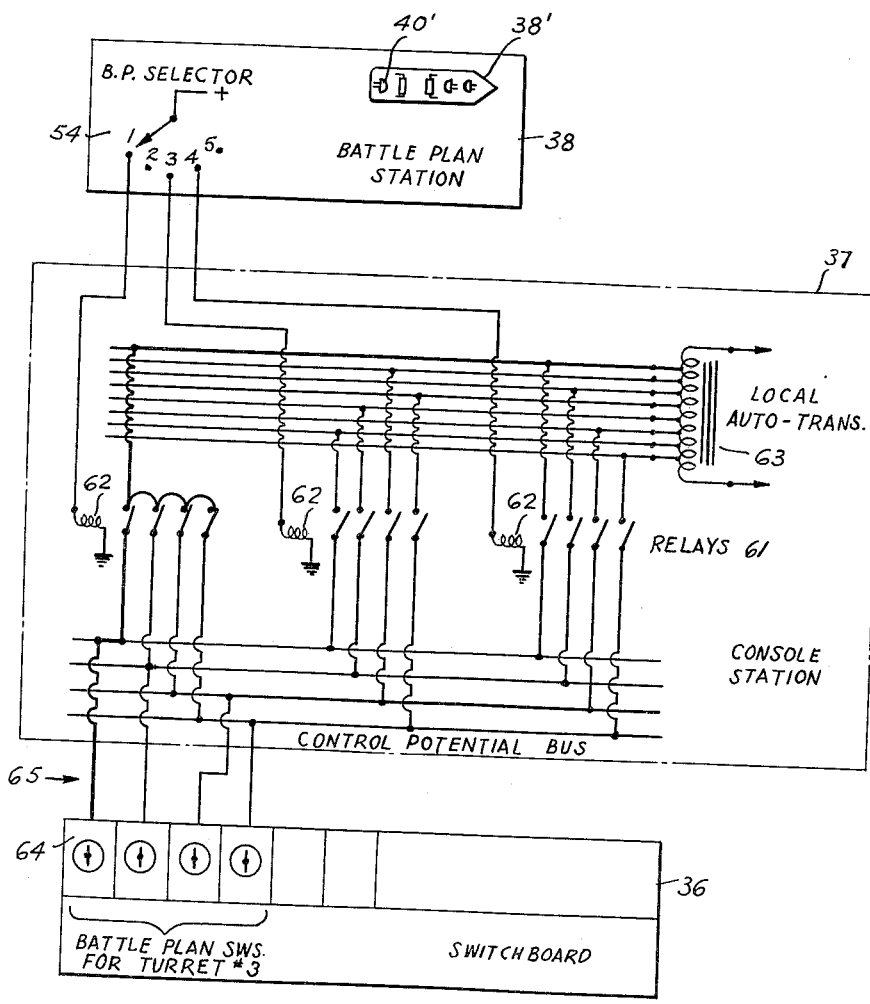

United States Patent Office 3,080,514
Patented Mar. 5, 1963

3,080,514
REMOTE CONTROL SWITCHING SYSTEM
Clifton T. Foss, Manhasset, and John J. Giba, Queens Village, N.Y., assignors to American Bosch Arma Corporation, a corporation of New York
Filed Jan. 10, 1948, Ser. No. 1,537
9 Claims. (Cl. 318—29)

This invention relates to an electrical switching system of the three wire remote control circuit type, and has particular reference to an automatic control system involving a complex arrangement of electrical switches and elements whereby each switching device is remotely controlled over one wire of the three in order to facilitate the electrical connection of individual or other units of equipment into any predetermined integrated group.

In accordance with the present invention, a three wire automatic remote control system is provided in which a control station composed of various conventional electrical indicating and switching elements is utilized to operate or position a remote switching device, or other control means, automatically by a single conductor, and whereby any number of switches can be automatically operated to achieve a predetermined combination of switch elements, by the use of a single conductor for each switching device requiring such automatic remote control.

In a preferred embodiment of the invention, rotary type switches having any desired number of positions are remotely controlled by the control potential method or by fixed potentials of selected magnitude, and a polarized relay or a directional relay is used to energize and de-energize the controlled driving element providing the synchronizing power, with commutating resistors connected to the winding taps of the remote station auto-transformer and switch segments providing the required voltage for ultimate synchronization. In an alternative form, a relay is employed in the single wire system, whereby several selected fixed potentials of divers magnitudes or values are simultaneously transmitted to control the operation of the several remote rotary switches in any desired combination of positions.

It will be seen that when adapted to such complex control problems as gun fire control on a modern battleship, for example, the present invention provides flexible means fo. the energization of the various fire control units, or any units of equipment, and for the combination of these units into a fire control group, or any other integrated group of units; quick and accurate means for the combination of selected fire control groups with selected gun turrets to suit an immediate fire control problem and means whereby such selection can be controlled by the commanding operator, or by the battle station operator; visual indicating means of the execution of the specific electrical arrangements of the fire control stations and battle plans, or the indication of the arrangement of the various pieces of equipment and the scheme of their control, and numerous other novel means with attendant advantages, which will become apparent upon examination of the accompanying drawings, in which:

FIG. 2 is a fragmentary view of a modified form of rotary commutator switch for use in a system having a small number of positions;

FIG. 4 is a functional diagram of the switching system of this invention as applied to gun fire control;

FIG. 4A is an enlarged detailed plan view of the indicator panel of the control station, showing its contour and arrangement in simulation of the plan of a battleship deck;

FIG. 7 is a schematic wiring diagram of part of the single wire remote fire control switching system as applied to one of the turrets.

In the following description, the given example of the controlled device is a rotary switch, but it is to be understood that other mechanical control means, such as a valve, a cam, a drive gear, or the like, can be substituted for the rotary switch. Also, a push button is given as an example of the controlling device, but a manually-positioned switch or any suitable means for manually choosing and closing a selected circuit may be employed with equal facility, and shall be referred to herein as a selector. Further, the system of this invention is described as applied to gun fire control units, but it can be equally applied to control the units of any industrial or processing equipment.

Figure 1:
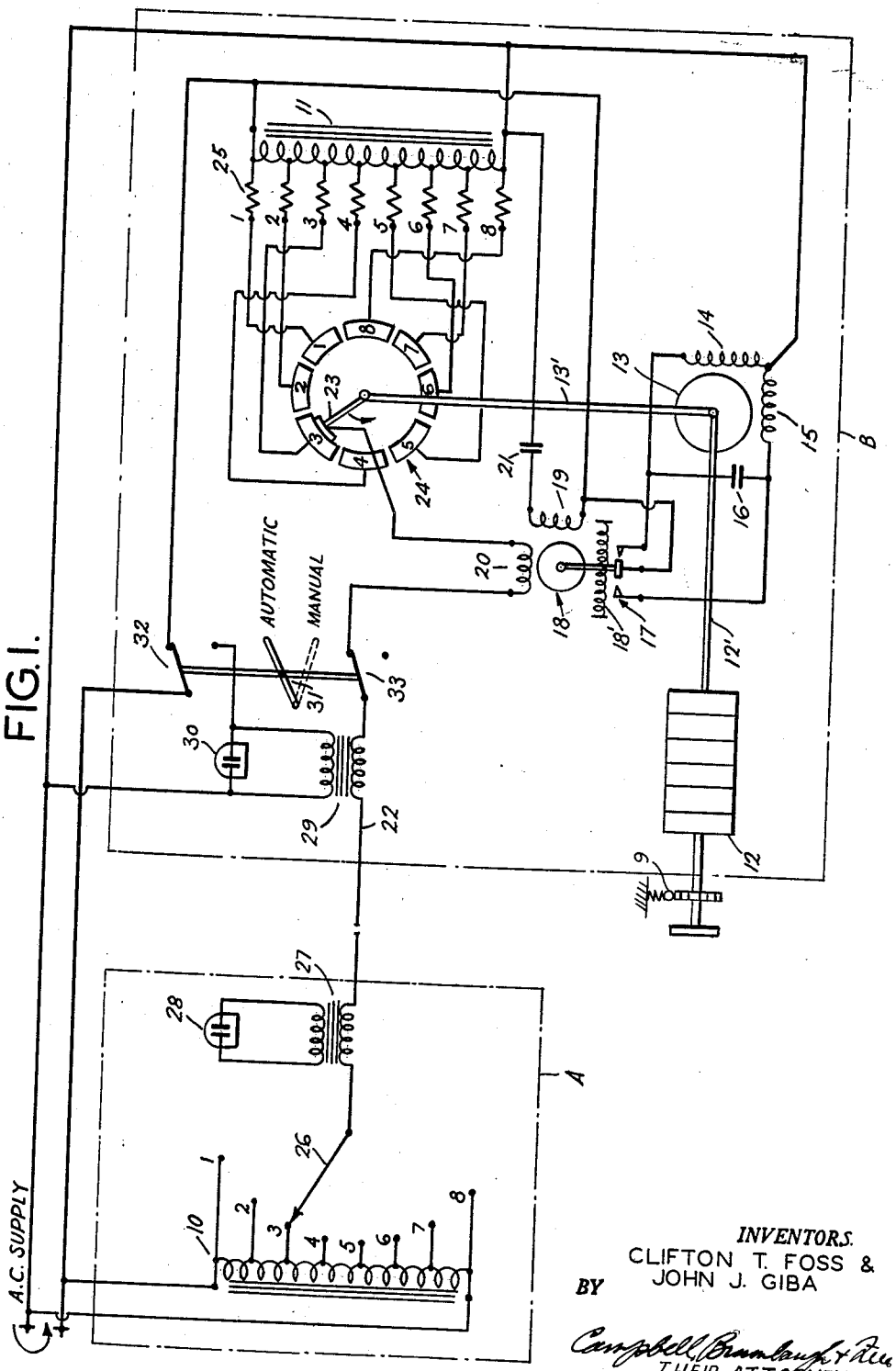
FIGURE 1 is a schematic wiring diagram of the basic single wire remote control switching system of this invention.

FIGURE 1 illustrates the basic system in which the manual setting of a selector switch at a local station A precisely positions a power driven rotary switch at a remote station B and also provides a visual indication at both the local and remote stations of the proper positioning of the power driven rotary switch at the remote station. As indicated in FIG. 1, both stations A and B are energized from the same single phase alternating current supply, and the control impulses are carried over the supply lines and an additional wire between the stations, so that in effect a single wire control system is obtained.

More particularly, the system of FIG. 1 consists of two similar auto-transformers 10 and 11 located respectively at the local and remote stations A and B and both energized from a common single phase alternating current supply source. The windings of each transformer 10 and 11 are provided with identically spaced taps, with the number of taps being equal to the number of positions of rotary switch 12 at the remote station B. In the illustrated example, the rotary switch 12 is arbitrarily provided with eight positions, and therefore the windings of both auto-transformers 10 and 11 are each provided with eight taps, as shown, although it will be understood that more or less positions may be employed for switch 12 with a corresponding number of taps on transformers 10 and 11.

Rotary switch 12 is the type which is positioned precisely by the action of the well-known detent and roller or ball combination indicated at 9 in FIG. 1, and is power driven by shaft 12' from a split phase induction motor 13, the common connection of its two field windings 14 and 15 being electrically connected to one side of the single phase alternating current supply. The other ends of the field windings 14 and 15 are arranged to be alternatively connected to the other side of the single phase alternating current supply by the reversing switch 17, which is mechanically actuated by the alternating current polarized relay 18. Hence, depending on which one of the contacts of the reversing switch 17 which is closed by relay 18, either field winding 14 or 15 of motor 13 is energized directly from the single phase alternating current supply with the other field winding being connected in series with the condenser 16, and vice versa. The capacitance of condenser 16 is selected of a value such as to produce a 90° phase relation between the electric currents in the two field windings 14 and 15, so that the action of the reversing switch 17 changes the phase sequence of the electric currents in the two field windings 14 and 15, thereby reversing the direction of rotation of the motor 13 and consequently the direction in which rotary switch 12 is positioned by shaft 12'.

The main field winding 19 of polarized relay 18 is energized from the single phase alternating current supply and its control field winding 20 is electrically connected in series with the single wire 22 between the local and remote stations A and B. Condenser 21 is connected in series with main field winding 19 of polarizing relay 18, and its capacitance is selected of the value such as to produce a 90° phase relation between the electric currents in the two field windings 19 and 20. The phase relation of the current in the control field winding 20 with respect to that in the main field winding 19, governs the direction of rotation of the armature of relay 18, so that the reversing switch contacts 17 are selected to effect the proper direction of rotation of the switch 12 by its driving motor 13.

The motor 13 also rotates shaft 13' to simultaneously drive the brush or contactor 23 of switch 24, which is of the commutator or contact segment type, and is provided with eight segments electrically insulated from each other and corresponding to the illustrative eight positions of switch 12. Each segment of switch 24 is electrically connected in sequence to a corresponding tap on the winding of the auto-transformer 11, through its corresponding commutating resistor 25. The brush 23 of switch 24 is connected in series with winding 20 of relay 18, normally closed switch 33 and single wire 22 to the local station A whose selector switch arm or brush 26 is arranged to cooperate with the respective taps on the winding of auto-transformer 10, these taps corresponding to the taps on the winding of auto-transformer 11 at remote station B.

In operation of the basic system of FIG. 1 as described, the motor 13 at remote station B is shown at rest after having positioned rotary switch 12 to position No. 3, by reason of the prior movement of selector switch arm 26 into engagement with tap No. 3 on the winding of auto-transformer 10 at local station A, with brush 23 consequently in engagement with segment No. 3 of remote switch 24. Motor 13 is at rest because the output voltages of remote station B are equal in magnitude to the corresponding output voltages of local station A and are opposed thereto, so that no current flows in the single conductor 22 or in the control field winding 20 of relay 18. Hence, the reversing switch 17 is in its neutral position, with both contacts 17 open and the field windings 14 and 15 of driving motor 13 deenergized.

In order to position rotary switch 12 at remote station B to any other position, say position No. 7, the selector switch arm 26 at local station A is first moved from tap No. 3 to tap No. 7 on the winding of auto-transformer 10, thus causing unbalance between the magnitudes of the output voltages of local station A and remote station B, so that current flows through single conductor 22 and the control field winding 20 of relay 18. The direction of this current flow is such as to cause the reversing switch 17 to so connect the alternating current supply to field windings 14 and 15 and condenser 16 of motor 13, that the latter drives rotary switch 12 and brush 23 of switch 24 to respective positions No. 7, at which point the output voltages of remote station B are equal in magnitude to the corresponding output voltages of local station A, and are opposed thereto. The control field winding 20 of relay 18 is accordingly deenergized, whereby switch 17 is returned to neutral by means of a centering spring 18' to open its contacts and thus deenergize the field windings 14 and 15 of the motor 13.

It will be observed that any difference in angular position between the selector switch arm 26 at local station A and the position of the brush 23 or remote switch 24 causes operation of the polarized relay 18, which, through the action of the switch 17, applies the full alternating current supply voltage to the driving motor 13. Motor 13 accordingly drives brush 23 into engagement with the contact on switch 24 corresponding to that engaged by location selector switch arm 26, resulting in the complete deenergization of this motor upon synchronization of rotary switch 12 with the position of selector switch arm 26.

FIG. 1 also illustrates means for giving a visual indication at local station A of the positional agreement or lack of positional agreement between the remote-controlled rotary switch 12 and the local controlling selector switch 26. This indication is simply afforded by an arrangement including transformer 27 and neon glow lamp 28 located at the local station A, with a similar indication provided at remote station B by means of transformer 29 and neon glow lamp 30. The primary windings of transformer 27 and 29 are both electrically connected in series with single conductor 22 between the stations, while the secondary windings of the transformers 27 and 29 are electrically connected to respective neon glow lamps 28 and 30. During automatic operation, the glow lamps 28 and 30 are lighted whenever electric current is flowing through single conductor 22, and therefore the lighting of the lamps is a visual indication of the lack of positional agreement between the controlling and controlled elements. Conversely, when the controlling and controlled elements are in positional agreement, no current flows through single conductor 22, so that non-lighting of the glow lamps is a visual indication of positional agreement between the controlling and controlled elements.

Manual or automatic operation of switch 12 may be selected at will by actuation to the proper position of two pole gang switch 31 at the remote station B, preferably adjacent the rotary switch 12. In the automatic position, the upper contactor 32 of switch 31 connects the alternating current supply to the elements of remote station B while lower contactor 33 connects the single wire control conductor 22 to the brush 23 at the remote station B. When switch 31 is moved to the manual position, contactor 32 interrupts the alternating current supply to the remote station B, thereby permitting the positioning of the rotary switch 12 manually, and also connects neon lamp 30 across the supply line so that it glows constantly to indicate that the system is not in automatic control. Also, the shifting of switch 31 to manual position causes contactor 33 to interrupt the single wire control conductor 22, so that the transformers 27 and 29 and the control field winding 20 of relay 18 are no longer affected by the relative positions of selector switch arm 26 and brush 23 of switch 24.

In cases where the rotary switch 12 has a comparatively small number of positions so that the segments of switch 24 are correspondingly few in number and large in angular contact surface, means are provided to assure that the brush 23 of switch 24 is driven through a sufficiently wide angular distance on the selected segment that the rotary switch 12 is positively positioned by the action of its detent and roller centering means. Thus, assuming that switch 24′ has but four contact segments as shown in FIG. 2, then brush 23′ is provided with a long shoe affording a relatively large angular contact surface, with the resistors 25b, 25c, 25d and 25e connected in series with the connections between the taps on the winding of auto-transformer 11′ and the corresponding contact segments of switch 24′.

In operation of the modified form of commutator switch shown in FIG. 2, the response of motor 13 to a change in setting of selector switch arm 26 of auto-transformer 10 drives brush 23′ to the selected segment of switch 24′. As the leading edge of brush 23′ moves from one segment to another, its width causes it to simultaneously engage the selected segment and the one behind it, say segments Nos. 2 and 1 as shown in FIG. 2, so that the corresponding resistors 25b and 25c in the circuits of the two segments affected provide a bridge circuit which causes the motor 13 to drive the brush 23′ to the point where its entire contact surface is engaging the selected segment, say No. 2, and the control field winding 20 of the relay 18 is deenergized. The length of the angular contact shoe of brush 23′ is chosen so that when all of the contact surface of brush 23′ is engaging the selected segment of switch 24′, the roller and detent of rotary switch 12 snaps the rotary switch 12 into its selected position.

Figure 3:
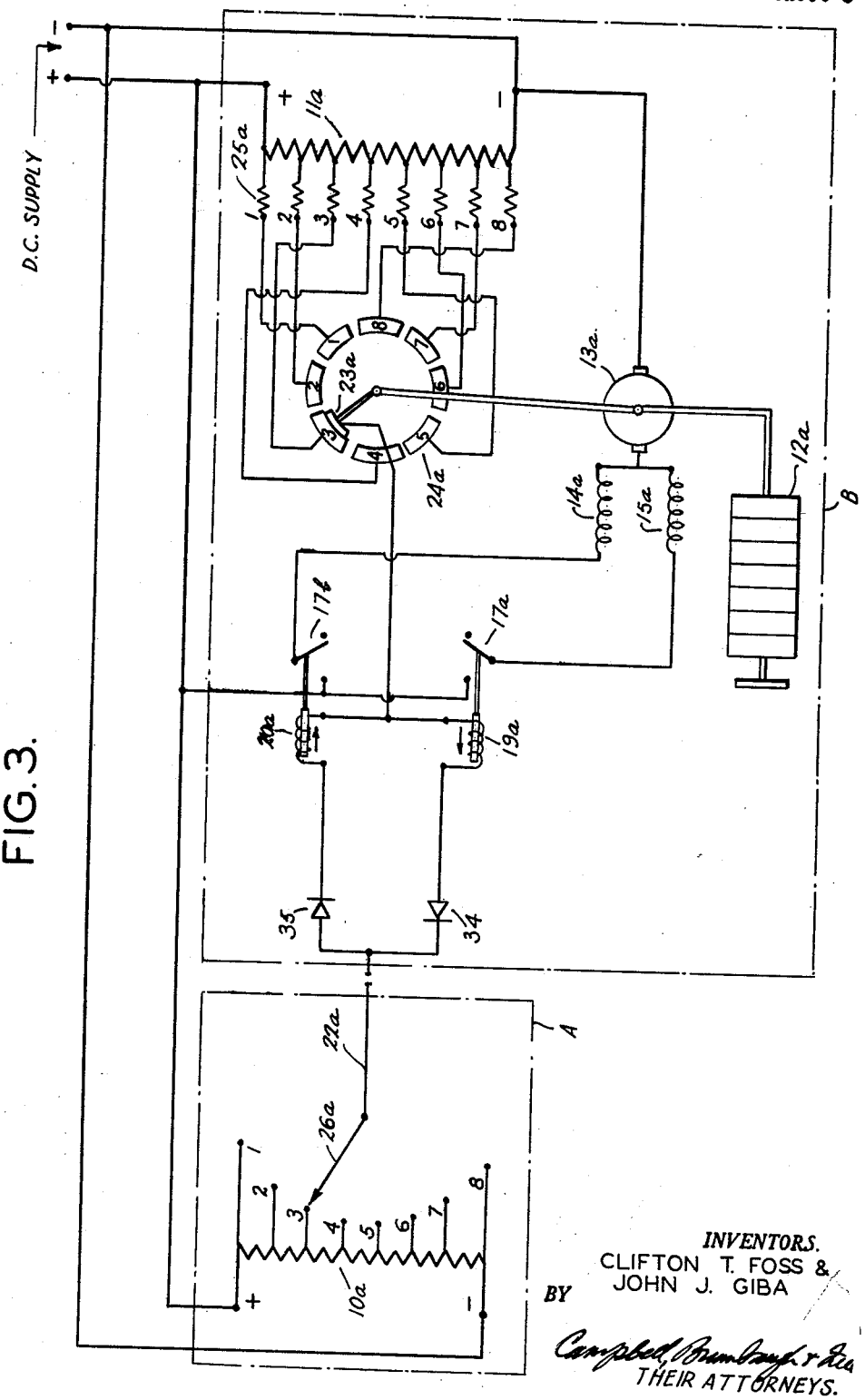
FIG. 3 is a modified form of the arrangement of FIG. 1 and shows an adaptation thereof for use with a direct current supply system.

FIG. 3 illustrates the adaptation of the single wire remote control system of this invention to use with a direct current supply source, wherein the respective auto-transformers 10 and 11 of FIG. 1 are replaced by tapped resistors, or resistance voltage dividers, 10a and 11a, and the alternating current polarized relay 18 of FIG. 1 is replaced by a circuit consisting of a copper-oxide rectifier 35, or other suitable means of providing unidirectional current flow, and a relay 20a having contact 17b, in parallel with a similar copper oxide rectifier 34 and relay 19a having contact 17a. The driving motor 13 of FIG. 1 is replaced by reversible series direct current motor 13a, with series field windings 14a and 15a.

The rectifiers 34 and 35 are connected in opposition as shown, so that rectifier 34 permits the flow of direct current through the single transmission conductor 22a in one direction only, whereas rectifier 35 permits the flow of direct current through the conductor 22a in the opposite direction only, with the direction of current flow through single conductor 22a depending upon the relative positions of the selector switch arm 26a and the brush 23a of commutation switch 24a at remote station B. Hence rectifier 34 permits energization of relay coil 19a for one direction or polarity of difference in direct current potential, thereby closing contact 17a to line, resulting in energization of motor 13a through the series field 15a. Similarly, rectifier 35 permits energization of the relay coil 20a for the opposite polarity of the difference in direct current potential, thereby closing contact 17b to line, resulting in energization of motor 13a through the series field 14a. Hence the direction of rotation of motor 13a is governed by the field energized, and it drives the rotary switch 12a and brush arm 23a of switch 24a into positional agreement with the selector switch arm 26a, in the manner previously explained in connection with FIG. 1. The equal and opposite potentials from the voltage dividers 10a and 11a deenergize the relay 19a or 20a, thereby opening contacts 17a or 17b, so that motor 13a is deenergized. It will be observed that, except for the differences mentioned, operation of the direct current system of FIG. 3 is basically the same as that of the alternating current system of FIG. 1.

The single wire, remote-controlled rotary switching system of this invention may be variously applied and, as an example, its adaptation as a means of providing quick and accurate connection of gun turrets and directors, or other types of weapons such as radar, searchlights, heavy machine guns, etc., into various combinations to suit the requirements of a gun fire control problem, will be described. Such adaptation is illustrated in FIG. 4 and consists of the following three major units, viz.:

A switchboard 36, a console station 37 and a battle plan station 38.

The switchboard 36, positioned remotely from console station 37, contains the automatically operated rotary type switch units, corresponding to 12 or 12a, which are each remotely controlled or positioned over one wire by the control potential method previously described.

The console station 37 containing selector switches like 26 or 26a is adapted for remotely selecting, energizing and combining various units such as directors, computers, and stable elements into a complete fire control group. On this console station a single selector is provided for each remote station, such as a director, computer, etc., for positioning by the single wire remote control described all of the energizing switches on the switchboard for that station. Similarly, instrument internal selection switches on the switchboard are positioned by corresponding selectors on the console station 37. The group selection switches on the switchboard 36 are positioned by corresponding selectors on the console station 37.

The energized stations on the ship are appropriately represented on the indicating panel 37′ of the console station, this panel 37′ being preferably shaped like a ship's plan silhouette and as indicated in the enlarged detail of FIG. 4A, is provided with the outlines of the fire control stations, such as directors, computers, stable elements, searchlights, etc., and the gun mounts or gun turrets, all of which are illuminated by distinctive colored lights energized when the corresponding selector like 26 in FIG. 1 is operated. Thus, the forward director silhouette 43′ may be illuminated green, and the after director silhouette 44′ may be illuminated red, while the gun turrets and stable elements and computers, etc., are then illuminated green or red, depending upon which director they are electrically connected with, or connecting lines between the units may be illuminated to indicate the interconnected units.

The battle plan station 38 contains a selector like 26, 26a, or push buttons or keys which are mechanically interlocked so that only one push button or key can be operated at a time, to execute the connection of predetermined combinations of the director fire control groups and the gun turrets, or other driven devices such as searchlights, radar, etc. On this battle plan station 38 a single selector position or pushbutton is provided for each battle plan, for connecting the gun turrets to the available director fire control groups. An illuminated panel 38′, shaped like a ship silhouette similar to panel 37′ on the console station 37 is also provided to indicate by distinguishing colors or other means the energization of the director fire control groups, the gun turrets, and the connection of the gun turret to a particular director fire control group.

The problem of quickly and accurately positioning the rotary switches on the fire control switchboard 36 is approached by classifying these switches as (a) energizing switches, i.e., those switches which merely energize transmitters, receivers, and other components, in the various stations or units of a fire control group, such as directors, computers, stable elements, etc., (b) instrument internal selection switches, i.e., those switches which provide for interchanging the selection of the primary or standby transmitter, i.e., selecting between a No. 1 and a No. 2 transmitter within the instrument itself, (c) group selection switches, i.e., those switches which connect a particular computer to a partciular director, or a particular stable element to a particular director, for example, to form a director fire control group, and (d) battle plan switches, i.e., those switches which connect a gun turret, or searchlight, or other driven devices, to a particular director fire control group. Switch groups a, b, and c are remotely controlled from the console station 37, and switch group d is remotely controlled from the battle plan station 38.

Figure 5:
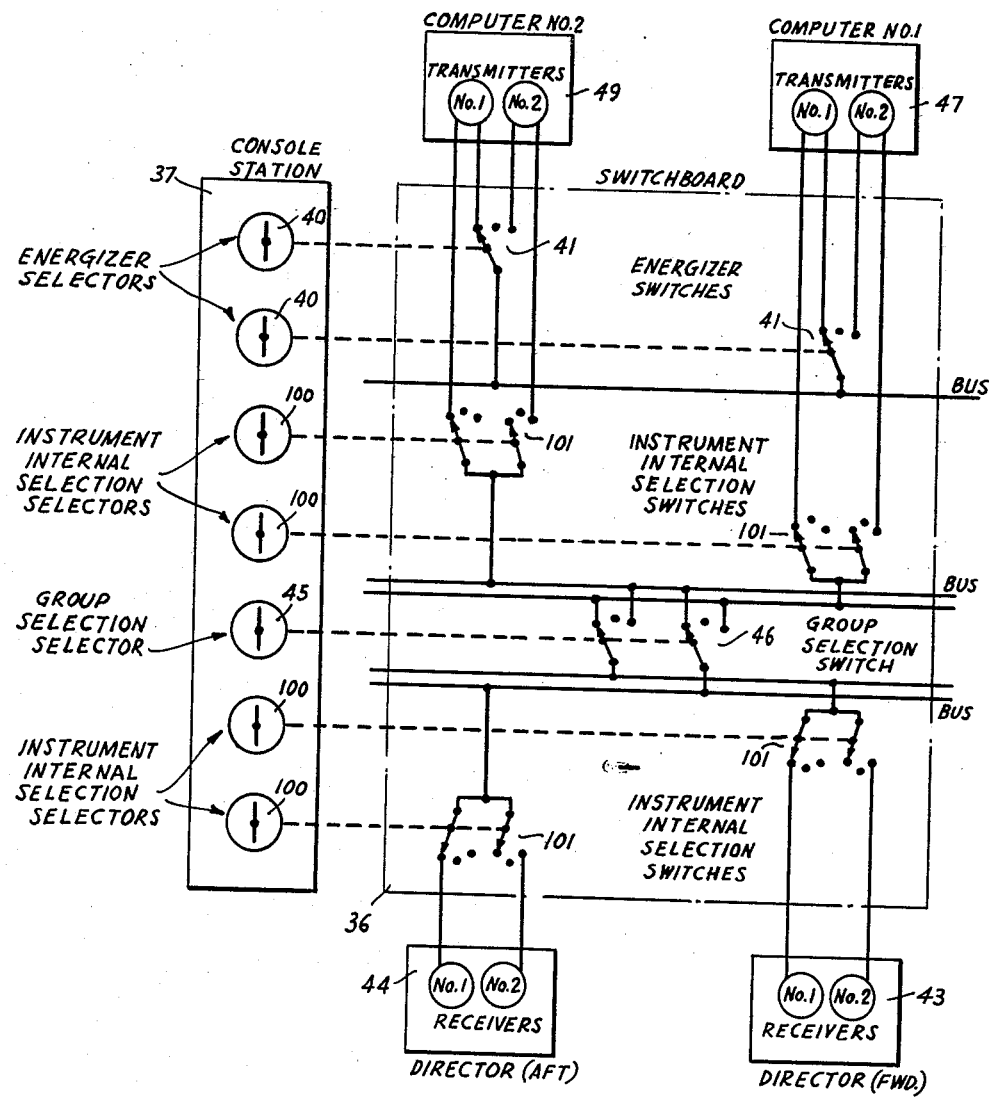
FIG. 5 is a single line wiring diagram, illustrating in part the console station of the gun fire control switching system.

FIG. 5 illustrates typical arrangements of energizer selectors 40 on the console station 37 for operating the energizer switches 41 (like 12 in FIG. 1) on the switchboard 36 so that transmitters No. 1 and No. 2, in the No. 1 and No. 2 computer stations 47 and 49 are energized. This diagram also illustrates how the instrument internal selection selectors 100 on the console station 37 operate the instrument internal selection switches 101 on the switchboard 36 so that either the primary or standby transmitter (No. 1 or No. 2) in each of the No. 1 and No. 2 computer stations 47 and 49 is selected and connected for use, and either the primary or standby receiver (No. 1 or No. 2) in each of the forward and aft director stations 43 and 44 is selected and connected for use. This diagram also illustrates how the group selection selector 45 on the console station 37 operates the group selection switches 46 on the switchboard 36 in order to connect the selected computer transmitters with the selected forward and aft director receivers.

In operation of the arrangement of FIGS. 4 and 5, the operator of console station 37 manually closes the energizer selector 40 for each fire control station requiring energization, which causes the energizing rotary switches 41 (like 12 of FIG. 1) on the switchboard 36 to move to their proper positions automatically by virtue of the single wire remote control system described, and the various stations are energized from the switchboard 36 via the energizing rotary switches 41. In similar fashion, the instrument internal selection switches are positioned on the switchboard 36. The ship's silhouette panel, by wires 50, then shows the forward director 43' silhouette illuminated by the green lamp, and the aft director 44' silhouette illuminated by a red lamp.

The operator at console station 37 manually positions the group selection selector 45 in order to combine the various and necessary stations into a desired fire control group. Operation of the group selection selectors, causes the group selection switches 46 on the switchboard 36 to move to their proper positions automatically by virtue of the single wire control system, so that a complete director fire control group is achieved. The stations connected to the forward director are then shown to be operative by reason of their symbols being illuminated with a green lamp on the ship's silhouette 37' and the stations connected to the aft director indicated operative by illumination of their symbols with a red lamp, thus indicating the two complete director fire control groups in operation.

An example of such grouping is illustrated functionally by FIG. 4, where energization and grouping of the No. 2 computer 49', the No. 2 stable element 48, and aft director 44' into a complete after director fire control group, and the energization of No. 3 turret 40', are effected. The single line connections 51 indicate the required electrical wiring from the selectors on the console station 37 to the switchboard 36 for controlling the various units in each fire control group that are affected and controlled by the selectors on console station 37.

Figure 6A:
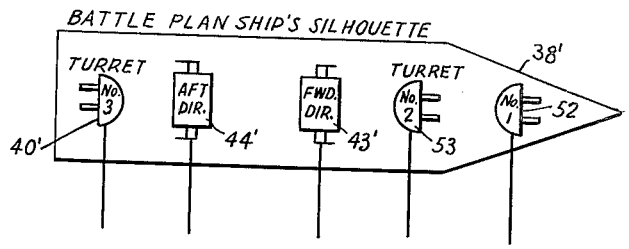
FIG. 6A is an enlarged detailed plan view of the panel of the battle plan station, showing its contour and arrangement in simulation of the plan of a battleship deck.
Figure 6:
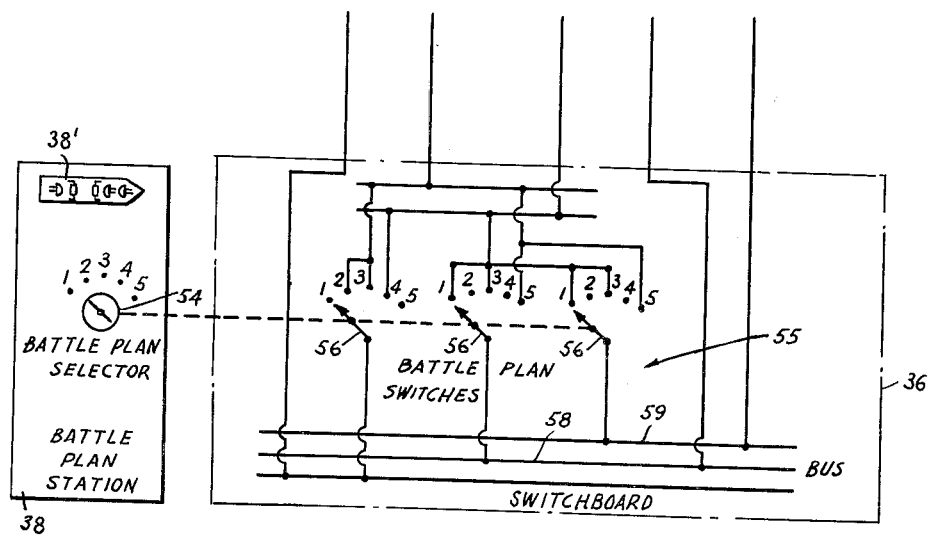
FIG. 6 is a single line wiring diagram of part of the battle plan station arrangement.

In this way, complete director fire control groups are made available and the gun turrets corresponding to 40', 52 and 53 on the panel 37' are energized by the operator of console station 37. However, the combining of the director fire control groups with the particular gun turrets remains the function of the operator of the battle plan station 38 and the functional arrangement of the battle plan station is illustrated by FIGS. 6 and 6A. These figures show a single line wiring diagram enabling the battle plan station operator, by control of the forward and aft directors, corresponding to 43' and 44' on panel 38', to execute the connection of predetermined combinations of the director fire control groups and gun turrets. Thus the operator manually positions the battle plan selector 54 (like 26 in FIG. 1) at the battle plan station to the selected battle plan, and this action causes automatic operation of the battle plan switches 55 on the switchboard 36, so that, for example, the following plans will be completed by the system:

Battle Plan 1=Fwd. Director Fire Control group to Turrets Nos. 1 and 2.
Battle Plan 2=Aft Director group to Turret No. 3.
Battle Plan 3=Fwd. Director group to Turrets Nos. 1 and 2, and Aft Director group to Turret No. 3.
Battle Plan 4=Fwd. Director group to Turret No. 3.
Battle Plan 5=Aft Director group to Turrets Nos. 1 and 2.

Assuming that battle plan 1 has been selected, the brush of selector 54 is moved to "1" as shown in FIG. 6, which causes the system of FIG. 1 to move switch 55 to "1." This switching arrangement disconnects turret No. 3, and connects the forward director to turrets Nos. 1 and 2, and provides coincident illumination of forward director symbol 43' and respective No. 1 and No. 2 turret symbols 52 and 53 on the ship's silhouette panel 38'.

The control circuits of FIG. 6 may be modified as shown in FIGS. 4 and 7, so that the battle plan selector 54 of the battle plan station 38 operates relays generally designated 61 in the console station 37, and the relays remotely control the automatically operated rotary switch units on the switchboard 36. In operation, the manual positioning of the battle plan selector 54 at the battle plan station 38 energizes a coil 62 of a particular relay 61 in the console station 37, depending upon the positioning of selector 54. It will be observed that each position of the battle plan selector 54 results in energization of a single relay 61 in the console station 37 and the positions result in energization of a different relay 61. Such energization of a relay coil 62 closes the relay contacts, and connects a selected magnitude of fixed potential from the local station auto-transformer 63 in relay console station 37, corresponding to 10 in FIG. 1, to the remote station rotary switch 64 located on the switchboard 36 and corresponding to 24, 12 in FIG. 1. Each rotary switch on the switchboard 36 is automatically operated and remotely controlled over one wire 65, leading from the local station auto-transformer 63 in the console station 37, through the contacts of the corresponding relay 61 and to the remote station rotary switch 64 on switchboard 36.

The number of contacts connected and closed by a particular relay 61 depends directly upon the number of rotary switches 64 required to be operated on the switchboard 36 in order to execute a certain combination or desired plan. Each contact of each relay 61 will transmit a fixed potential of selected value from the relay station auto-transformer 63 to each rotary switch 64 on the switchboard 36 which requires operation in order to execute a certain combination or desired plan. Hence, any number of rotary switches 64 can be controlled by the selector 54 on the battle plan station 38, by action of the relays 61 of console station 37, and each rotary switch 64 is positioned automatically over one corresponding wire 65. Therefore, by the manual positioning of a controlling selector like 54, a definite magnitude of fixed potential is transmitted to the cooperating controlled rotary switch or switches, and for each of the specific and definite potentials transmitted there is a specific and definite position which the rotary switch automatically assumes, so that there is ultimate agreement between a definite potential and a definite switch position. Also, the definite magnitude of fixed potential produced by the controlled rotary switch station auto-transformer in correspondence with the ultimate position of the rotary switch, is substantially equal and opposed to the definite magnitude of fixed potential transmitted by the console station auto-transformer 63.

In order to illustrate the execution of a predetermined battle plan, FIG. 7 has been made to indicate the remote control switching requirements for turret No. 3 whose symbol is designated 40' on ship silhouette panel 38' in FIGS. 4A, 6A and 7. It is assumed that the plans can be accomplished by the four rotary battle plan switches 64 indicated in FIG. 7 as located on the switchboard 36, so that four of the contacts of each of the relays 61 are used for this purpose. Each of the four rotary switches 64 is connected to a selected fixed potential tap from the console station auto-transformer 63, through the four contacts of the relays 61. The operation of each relay 61 is controlled by the battle plan station selector 54, and each relay transmits selected fixed potentials to the four remote controlled rotary switches 64, and the potential transmitted by any one relay contact to any one rotary switch 64 depends upon the ultimate positioning required for that switch.

The positioning of the battle plan selector 54 on the battle plan station operates and moves the four battle plan rotary switches 64, located on the switchboard 36, so that turret No. 3 is combined with the director fire control groups as follows:

| Battle plan control switch position | Battle plan | Battle plan execution |
| --- | --- | --- |
| No. 1 | I | Turret No. 3, Off. |
| No. 3 | III | Turret No. 3 to Aft Director. |
| No. 4 | IV | Turret No. 3 to Fwd. Director. |

Numerous other devices arranged in a complex system may be similarly controlled from a distant point, and although control of a gun fire system has been described herein, it is to be understood that it was given merely by way of illustration of the adaptability of the invention and that the invention is not limited thereby, but is susceptible of variations in form and detail within the scope of the appended claims.

We claim:

1. In a remote control system, the combination of a source of electric power, like windings at local and remote stations energized by said power source and each having an equal number of like taps, a commutator at the remote station having segments corresponding to the taps on said remote station winding and connected thereto, resistors interposed in the connection between each segment and its corresponding tap, contacts at the local station corresponding to the taps on said local station winding and connected thereto, a brush at the local station adapted to severally engage the said contacts, a brush at the remote station adapted to severally engage the said commutator segments, a single wire connection extending between the said brushes at the local and remote stations, electrical motive means energized by said source for driving said remote station brush, having a pair of field windings, a reversing switch interposed between said source and said field windings for alternatively connecting one of the field windings thereto, means interposed in said single wire connection and responsive to changes in the electrical power flow therein produced by movement of said local station brush for actuating said reversing switch to control the direction of movement of said motive means and driving said remote station brush in synchronism with said location station brush, a variable position driven element at said remote station operatively connected to said motive means and positioned thereby in accordance with the position of the brush at said local station, and indicating means at least at said local station and responsive to cessation of power flow in said single wire connection for indicating synchronism of said driven element with said local station brush.

2. In a remote control system, the combination of a source of alternating current, like autotransformer windings at local and remote stations energized by said power source and each having an equal number of like taps, a commutator at the remote station having segments corresponding to the taps on said remote station winding and connected thereto, contacts at the local station corresponding to the taps on said local station winding and connected thereto, a brush at the local station adapted to severally engage the said contacts, a brush at the remote station adapted to severally engage the said commutator segments, a single wire connection extending between the said brushes at the local and remote stations, electrical motive means energized by said source for driving said remote station brush, and having a pair of field windings, a reversing switch interposed between said source and said field windings for alternatively connecting one of the field windings thereto, a polarizing relay having one winding energized from said source and its other winding interposed in said single wire connection and responsive to changes in the electrical power flow therein produced by movement of said local station brush for actuating said reversing switch, a condenser bridged across the contacts of said reversing switch for alternative series connection with one of said field windings to change the phase sequence in said field windings upon actuation of said reversing switch, a transformer located at least at one of said stations having its primary winding interposed in said single wire connection, and a gas-filled glow-lamp connected to the secondary winding of said transformer and energized by current flow in said single wire connection for indicating asynchronism between said brushes.

3. In a remote control system, the combination of a source of direct current, like resistance windings at local and remote stations energized by said power source and each having an equal number of like taps, a commutator at the remote station having segments corresponding to the taps on said remote station winding and connected thereto, contacts at the local station corresponding to the taps on said local station winding and connected thereto, a brush at the local station adapted to severally engage the said contacts, a brush at the remote station adapted to severally engage the said commutator segments, a single wire connection extending between the said brushes at the local and remote stations, electrical motive means energized by said source for driving said remote station brush, and having a pair of field windings, reversing switch means interposed between said source and said field windings for alternatively connecting one of the field windings thereto, a pair of reversed unidirectional current flow valves parallelly interposed in said single wire connection and electromagnetic means in series with each of said valves and responsive to changes in the electrical power flow therein produced by movement of said local station brush for actuating said reversing switch means to control the direction of movement of said motive means and driving said remote station brush in synchronism with said local station brush.

4. In a remote control system, the combination of a source of electric power, a local station having a winding energized from said source and sub-divided by a predetermined number of taps having corresponding contacts, a remote station winding energized from said source and sub-divided by said predetermined number of taps having corresponding commutator segments, a brush at said local station adapted to severally engage said contacts, a brush at said remote station adapted to severally engage said commutator segments, a single wire connections extending between the said brushes at the local and remote stations, electrical motive means energized from said source and having a pair of field windings, a reversing switch interposed between said source and said field windings for alternatively connecting one of said field windings to said source, means responsive to change in the electrical power flow in said single wire connection produced by movement of said local station brush for actuating said reversing switch, operative connections between said motive means and said remote station brush for driving the same to the commutator segment corresponding to the contact engaged by said local station brush, a plurality of remote switches each having a plurality of contacts equal to said predetermined number and corresponding thereto, operative connections between said motive means and said remote switches for actuating them into positional synchonism with said local station brush, and electrical indicators at said local station corresponding to said remote switches for indicating the condition thereof.

5. In a remote control system, the combination of a source of electric power, a local station having a winding energized from said source and sub-divided by a predeterminde number of taps having corresponding contacts, a remote station winding energized from said source and sub-divided by said predetermined number of taps having corresponding commutator segments, a brush at said local station adapted to severally engage said contacts, a brush at said remote station adapted to severally engage said commutator segments, a single wire connection extending between the said brushes at the local and remote stations, electrical motive means energized from said source and having a pair of field windings, a reversing switch interposed between said source and said field windings for alternatively connecting one of said field windings to said source, means responsive to changes in the electrical power flow in said single wire connection produced by movement of said local station brush for actuating said reversing switch, operative connections between said motive means and said remote station brush for driving the same to the commutator segment corresponding to the contact engaged by said local station brush, a remote switchboard, a plurality of switches on said switchboard, each having a plurality of contacts equal to said predetermined number and corresponding thereto, and operative connections between said motive means and said remote switches on said switchboard for actuating them into positional synchronism with said local station brush.

6. In a remote control system, the combination of a source of electric power, a local station having a winding energized from said source and sub-divided by a predetermined number of taps having corresponding contacts, a remote station winding energized from said source and sub-divided by said predetermined number of taps having corresponding commutator segments, a brush at said local station adapted to severally engage said contacts, a brush at said remote station adapted to severally engage said commutator segments, a single wire connection extending between the said brushes at the local and remote stations, electrical motive means energized from said source and having a pair of field windings, a reversing switch interposed between said source and said field windings for alternatively connecting one of said field windings to said source, means responsive to changes in the electrical power flow in said single wire connection produced by movement of said local station brush for actuating said reversing switch, operative connections between said motive means and said remote station brush for driving the same to the commutator segment corresponding to the contact engaged by said local station brush, a remote switch having a plurality of contacts equal to said predetermined member and corresponding thereto, operative connections between said motive means and said remote switch for actuating the same in synchronism with said local station switch, a plurality of conductors, various connections between said remote switch contacts and said conductors for selectively energizing the same at different positions of said remote switch, and a plurality of electrical means variously connected to said conductors for selective energization in accordance with the energization of the corresponding conductors by the remote switch.

7. In a remote control system, the combination of a source of electric power, a local station having a winding energized from said source and sub-divided by a predetermined number of taps having corresponding contacts, a remote station winding energized from said source and sub-divided by said predetermined number of taps having corresponding commutator segments, a brush at said local station adapted to severally engage said contacts, a brush at said remote station adapted to severally engage said commutator segments, a single wire connection extending between the said brushes at the local and remote stations, electrical motive means energized from said source and having a pair of field windings, a reversing switch interposed between said source and said field windings for alternatively connecting one of said field windings to said source, means responsive to changes in the electrical power flow in said single wire connection produced by movement of said local station brush for actuating said reversing switch, operative connections between said motive means and said remote station brush for driving the same to the commutator segment corresponding to the contact engaged by said local station brush, a plurality of remote switches each having a plurality of contacts equal to said predetermined number and corresponding thereto, operative connections between said motive means and said remote switches for actuating them into positional synchronism with said local station brush, a plurality of conductors, various connections between the contacts of each of said remote switches and said conductors for selectively energizing the same at different positions of said remote switches, and a plurality of electrical means variously connected to said conductors for selective energization in accordance with the energization of the corresponding conductors by the remote switches.

8. In a remote control system, the combination of a source of electric power, a winding energized from said source and sub-divided by a predetermined number of taps, a relay having a plurality of contacts adapted to be simultaneously closed upon actuation of said relay, a local switch connected to said relay for energizing the same, several connections between said relay contacts and said winding taps, a plurality of conductors variously connected to said relay contacts, a plurality of remote windings energized from said source and sub-divided by said predetermined number of taps having corresponding commutator segments, a brush for each commutator, a single wire connection extending between each of said brushes and one of said conductors, motive means for driving each brush, means responsive to changes in the electrical power flow in said single wire connection for energizing the corresponding motive means to drive its brush to the commutator segment corresponding to the said conductor connected to the first winding tap by said relay, a plurality of remote switches each having a plurality of contacts equal to said predetermined number of first winding taps and corresponding thereto, and operative connections between each said motive means and the corresponding remote switch for positioning the same in accordance with the connection of said conductors to said first winding taps by said relay.

9. In a remote control system, the combination of a source of electric power, a winding energized from said source and sub-divided by a predetermined number of taps, a plurality of relays each having a plurality of contacts adapted to be simultaneously closed upon actuation of said corresponding relay, a local switch having a plurality of contacts each connected to one of said relays for energizing the same, several connections between each of said relay contacts and said winding taps, a plurality of conductors variously connected to each of said relay contacts, a plurality of remote windings energized from said source and sub-divided by said predetermined number of taps having corresponding commutator segments, a brush for each commutator, a single wire connection extending between each of said brushes and one of said conductors, motive means for driving each brush, means responsive to changes in the electrical power flow in said single wire connection for energizing the corresponding motive means to drive its brush to the commutator segment corresponding to the said conductor connected to the first winding tap by the corresponding said relay, a plurality of remote switches each having a plurality of contacts equal to said predetermined number of first winding taps and corresponding thereto, and operative connections between each said motive means and the corresponding remote switch for positioning the same in accordance with the connection of said conductors to said first winding taps by said relay.

References Cited in the file of this patent
UNITED STATES PATENTS

| | | |
|---|---|---|
| 502,399 | Haskins | Aug. 1, 1893 |
| 559,903 | Pfatischer | May 12, 1896 |
| 2,020,275 | Beers | Nov. 5, 1935 |
| 2,226,846 | Clark | Dec. 31, 1940 |
| 2,294,210 | Roters | Aug. 25, 1942 |